US011393414B2

(12) United States Patent
Sun et al.

(10) Patent No.: US 11,393,414 B2
(45) Date of Patent: Jul. 19, 2022

(54) DISPLAY DEVICE, VIRTUAL REALITY DISPLAY APPARATUS AND DISPLAY DEVICE CONTROL METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jian Sun, Beijing (CN); Lin Lin, Beijing (CN); Ziqiang Guo, Beijing (CN); Xinjian Liu, Beijing (CN); Zhen Tang, Beijing (CN); Yu Lei, Beijing (CN); Yakun Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 613 days.

(21) Appl. No.: 16/332,938

(22) PCT Filed: Sep. 20, 2018

(86) PCT No.: PCT/CN2018/106671
§ 371 (c)(1),
(2) Date: Mar. 13, 2019

(87) PCT Pub. No.: WO2019/144633
PCT Pub. Date: Aug. 1, 2019

(65) Prior Publication Data
US 2021/0335289 A1 Oct. 28, 2021

(30) Foreign Application Priority Data

Jan. 26, 2018 (CN) .......................... 201810076174.4

(51) Int. Cl.
*G09G 3/34* (2006.01)
*G02F 1/1335* (2006.01)
(Continued)

(52) U.S. Cl.
CPC ..... *G09G 3/3426* (2013.01); *G02F 1/133512* (2013.01); *G02F 1/133603* (2013.01);
(Continued)

(58) Field of Classification Search
CPC .. G09G 3/3426; G09G 3/36; G02F 1/133612; G02F 1/133512; G02F 1/133603
See application file for complete search history.

(56) References Cited

U.S. PATENT DOCUMENTS 10,747,061 B2 * 8/2020 Suh .................... G02F 1/133617
10,782,551 B2 * 9/2020 Cui ........................ G02F 1/1336
(Continued)

FOREIGN PATENT DOCUMENTS

CN 104749817 A 7/2015
CN 104835456 A 8/2015
(Continued)

OTHER PUBLICATIONS

Search Report and Written Opinion for International Application No. PCT/CN2018/106671 dated Nov. 29, 2018.

*Primary Examiner* — Fred Tzeng
(74) *Attorney, Agent, or Firm* — Calfee, Halter & Griswold LLP (57) ABSTRACT

A display device, a virtual reality display apparatus and a display device control method. The display device includes: a liquid crystal panel, which includes a plurality of sub-pixel groups and a first black matrix, each of the sub-pixel groups including n consecutive rows of sub-pixels, the first black matrix being disposed between two adjacent sub-pixel groups, and n being any positive integer, and a backlight,
(Continued)

which includes a plurality of sub-light source groups and a second black matrix, which second black matrix is disposed between two adjacent sub-light source groups, each of the sub-light source groups being disposed in one-to-one correspondence with each of the sub-pixel groups, and the second black matrix having the same light-shielding region as the first black matrix.

20 Claims, 3 Drawing Sheets (51) Int. Cl.
*G02F 1/13357* (2006.01)
*G09G 3/36* (2006.01)
(52) U.S. Cl.
CPC ......... *G02F 1/133612* (2021.01); *G09G 3/36* (2013.01); *G09G 2310/024* (2013.01); *G09G 2310/08* (2013.01); *G09G 2320/0233* (2013.01); *G09G 2320/0626* (2013.01)

(56) References Cited

U.S. PATENT DOCUMENTS

| | | | |
|---|---|---|---|
| 2003/0020847 A1 | 1/2003 | Kim et al. | |
| 2003/0122980 A1 | 7/2003 | Jin et al. | |
| 2004/0252266 A1* | 12/2004 | Shimizu | G02F 1/133512 349/139 |
| 2007/0103620 A1* | 5/2007 | Leu | G02B 5/203 349/106 |
| 2007/0230216 A1* | 10/2007 | Ite | G02B 6/0038 362/620 |
| 2010/0134909 A1* | 6/2010 | Lin | G02B 5/201 359/891 |
| 2010/0283803 A1* | 11/2010 | Chou | G02F 1/133514 345/690 |
| 2011/0109853 A1* | 5/2011 | Ge | G02F 1/1343 349/114 |
| 2012/0057091 A1* | 3/2012 | Kawabata | G02F 1/136213 349/38 |
| 2013/0002974 A1* | 1/2013 | Minato | G02B 5/201 349/43 |
| 2014/0267955 A1* | 9/2014 | Hibayashi | G02F 1/134309 349/12 |
| 2014/0354597 A1* | 12/2014 | Kitchens, II | G06F 3/043 345/175 |
| 2015/0253604 A1* | 9/2015 | He | G02F 1/13394 349/42 |
| 2017/0160610 A1 | 6/2017 | Ye | |
| 2017/0255054 A1* | 9/2017 | Li | G02F 1/133617 |
| 2017/0255069 A1* | 9/2017 | Wu | G02F 1/133514 |
| 2018/0067590 A1* | 3/2018 | Wang | G06F 3/0412 |
| 2018/0074374 A1* | 3/2018 | Lu | G02F 1/133603 |
| 2018/0081183 A1* | 3/2018 | Lu | H04N 13/383 |
| 2020/0081262 A1* | 3/2020 | Tan | G03H 1/2294 |
| 2021/0173240 A1* | 6/2021 | Li | G02F 1/134309 |

FOREIGN PATENT DOCUMENTS

| | | |
|---|---|---|
| CN | 105116651 A | 12/2015 |
| CN | 105487306 A | 4/2016 |
| CN | 105989792 A | 10/2016 |
| CN | 107145009 A | 9/2017 |
| CN | 108227287 A | 6/2018 |

* cited by examiner

DISPLAY DEVICE, VIRTUAL REALITY DISPLAY APPARATUS AND DISPLAY DEVICE CONTROL METHOD

RELATED APPLICATIONS

The present application is the U.S. national phase entry of PCT/CN2018/106671, with an international filing date of Sep. 20, 2018, which claims the benefit of Chinese Patent Application No. 201810076174.4 filed on Jan. 26, 2018, the entire disclosures of which are incorporated herein by reference.

TECHNICAL FIELD

The disclosure relates to the field of display technology, and in particular, to a display device and a control method thereof.

BACKGROUND

With the development of virtual reality technology, display products for virtual reality have many new requirements for display devices, for example, high PPI (Pixels Per Inch), rapid response, etc.

SUMMARY

According to a first exemplary embodiment of the disclosure, there is provided a device including: a liquid crystal panel, which includes a plurality of sub-pixel groups and a first black matrix, each of the sub-pixel groups including n consecutive rows of sub-pixels, n being any positive integer, and the first black matrix being disposed between two adjacent sub-pixel groups, and a backlight, which includes a plurality of sub-light source groups and a second black matrix, which second black matrix is disposed between two adjacent sub-light source groups, each of the plurality of sub-light source groups being disposed in one-to-one correspondence with each of the plurality of sub-pixel groups, and the second black matrix having a same light-shielding region as the first black matrix.

In at least one embodiment, each of the plurality of sub-light source groups includes one or more light emitting devices, each light emitting device corresponds to at least one sub-pixel, and the one or more light emitting devices is organic light emitting diodes.

In at least one embodiment, the backlight further includes a substrate, and the one or more light emitting devices is arranged on the substrate, such that light emitted by the one or more light emitting devices directly light the liquid crystal panel.

In at least one embodiment, each of the plurality of sub-pixel groups includes 4 or 8 rows of sub-pixels.

In at least one embodiment, the display device further includes a light source group controller, configured to control the plurality of sub-light source groups to be lit or closed line by line.

In at least one embodiment, the light source group controller includes: a sub-controller configured to obtain a frame synchronization signal and a first setting parameter, and generate and output a timing control signal according to the frame synchronization signal and the first setting parameter, wherein the timing control signal is configured to control the plurality of sub-light source groups to be lit or closed line by line, wherein the frame synchronization signal is configured to keep a synchronization between the liquid crystal panel and the backlight, and the first setting parameter is related with continuous lighting time of each sub-light source group.

In at least one embodiment, the sub-controller is further configured to obtain a second setting parameter, and generate and output a drive control signal as to control lighting degree of each sub-light source group according to the second setting parameter, wherein the second setting parameter is related with the lighting degree of each sub-light source groups.

In at least one embodiment, the light source group controller further includes: a backlight timing sub-controller is configured to receive the timing control signal outputted by the sub-controller, and control lighting and closing time of each of the plurality of sub-light source groups according to the timing control signal.

In at least one embodiment, the light source group controller further includes: a backlight driving sub-controller is configured to receive the drive control signal outputted by the sub-controller, and control the lighting degree of each of the sub-light source groups according to the drive control signal.

In at least one embodiment, a third black matrix is disposed between two adjacent rows of sub-pixels within each of the sub-pixel groups.

According to a second exemplary embodiment of the disclosure, there is provided a virtual reality display apparatus including a display device as described above.

According to a third exemplary embodiment of the disclosure, there is provided a display device control method for controlling a display device according to at least one embodiment including: obtaining the frame synchronization signal and the first setting parameter, generating and outputting a timing control signal according to the frame synchronization signal and the first setting parameter, and controlling the lighting and closing time of each of the plurality of sub-light source groups according to the timing control signal.

In at least one embodiment, the obtaining the frame synchronization signal includes: receiving the frame synchronization signal from the liquid crystal panel when each time the display device is refreshed, wherein the frame synchronization signal in configured to keep a synchronization between the liquid crystal panel and the backlight.

In at least one embodiment, the generating and outputting a timing control signal according to the frame synchronization signal and the first setting parameter includes: determining a scan start moment t0 of a first row of sub-pixels of the liquid crystal panel, a scan interval Ts of two adjacent rows of sub-pixels and a scan period T of one frame of the liquid crystal panel based on the frame synchronization signal, determining a start lighting moment $t1=t0+n*Ts+Td$ of a first sub-light source group of the backlight, a row scan period $Ttotal=T$ of each of the sub-light source groups of the backlight and a lighting interval $\Delta t=n*Ts$ of two adjacent sub-light source groups based on the scan start moment t0, the scan interval Ts and the scan period T, wherein Td is the response time of a liquid crystal molecule, and n is the number of rows of sub-pixels included by each of the sub-pixel groups, determining a continuous lighting time Ton of each of the plurality of sub-light source groups of the backlight based on the first setting parameter, and generating a timing control signal based on the start lighting moment t1, the row scan period Ttotal, the lighting interval $\Delta t$ and the continuous lighting time Ton.

According to a fourth exemplary embodiment of the disclosure, there is provided a display device control method for controlling a display device as claimed in claim 9, which method includes: obtaining the second setting parameter, generating and outputting a drive control signal according to the second setting parameter, and controlling the lighting brightness of each of the plurality of sub-light source groups according to the drive control signal.

BRIEF DESCRIPTION OF THE DRAWINGS

Other features, objects and advantages of this application will become more evident by reading a detailed description of non-limiting embodiments made with reference to the following drawings.

DETAILED DESCRIPTION

The following the application will be further described in detail in conjunction with the drawings and embodiments. It may be appreciated that the specific embodiments described herein are merely used for explaining the related disclosure, but do not limit the disclosure. In addition, it further needs to be noted that only those parts related with the disclosure are shown in the drawings for the convenience of description.

It needs to be noted that, in the absence of conflict, the embodiments in this application and the features in the embodiments may be combined with each other. In the following, the application will be described in detail with reference to the drawings and in conjunction with the embodiments.

The technical terminology or the scientific terminology used in the disclosure should have the general meanings understood by the person having general skills in the art, unless otherwise defined. The "first", "second" and similar words used in the disclosure do not mean any order, number or importance, but are just used to differentiate between different constituent parts. Likewise, the word "include" or "included" or the like means that an element or article preceding the word encompasses the element or article listed behind the word and the equivalent thereof, without excluding other elements or articles. The word "connection" or the like is not limited to a physical or mechanical connection, but may include an electrical connection or a signal connection, whether it is direct or indirect.

When applied in virtual reality products, owing to their requirements for rapid response, liquid crystal display devices will result in a serious smear problem of display pictures, which greatly affects user's visual and immersive experiences, and the liquid crystal display devices further have an intractable light leakage problem.

In some reference, the utilization of the backlight black insertion technique may improve the smear phenomenon of liquid crystal display devices to a certain degree. However, when it comes to backlight partition in the prior black insertion technique, there is the light leakage problem between two adjacent partitions. Furthermore, the black insertion is limited by the scan time, and the screen brightness is low or the screen brightness after the black insertion cannot be effectively dynamically adjusted.

Figure 1:
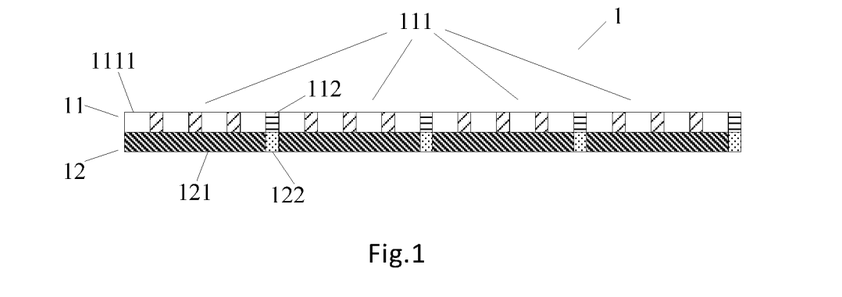
FIG. 1 shows a structural diagram of a display device according to at least one exemplary embodiment.

FIG. 1 shows a structural diagram of a display device according to at least one embodiment of the application.

As shown in FIG. 1, the display device includes: a liquid crystal panel 11, which includes a plurality of sub-pixel groups 111 and a first black matrix 112, each of the sub-pixel groups 111 including n consecutive rows of sub-pixels 1111, n being any positive integer, and the first black matrix 112 being disposed between two adjacent sub-pixel groups 111, and a backlight 12, which includes a plurality of sub-light source groups 121 and a second black matrix 122, which second black matrix 122 is disposed between two adjacent sub-light source groups 121, each of the sub-light source groups 121 being disposed in one-to-one correspondence with each of the sub-pixel groups 111, and the second black matrix 122 having the same light-shielding region as the first black matrix 112.

Therein, each sub-pixel group 111 includes n consecutive rows of sub-pixels 1111, wherein the value of n may be adaptively set according to specific needs. The number n of rows of sub-pixels 1111 included by each sub-pixel group 111 is identical, wherein a black matrix may also be disposed between two adjacent rows of sub-pixels 1111 in each sub-pixel group 111, which black matrix is used for preventing a light leakage problem from arising between sub-pixels.

Therein, the backlight 12 includes a plurality of sub-light source groups 121, each of the sub-light source groups 121 may include one or more light emitting devices, and each light emitting device corresponds to at least one sub-pixel. The light emitting device may be an organic light emitting diode OLED or LED microminiaturization and matrixing technique Micro LED. The number of light emitting devices may be reasonably set according to the specific display brightness requirements. In an example, considering the preparation process and the luminous effect comprehensively, each row of sub-light source group 121 includes the same number of light emitting devices.

Therein, the second black matrix 122 is disposed between two adjacent sub-light source groups 121, and its light-shielding region is the same as that of the first black matrix 112. In the embodiment of the application, the second black matrix is disposed between adjacent sub-light source groups, and the second black matrix has the same light-shielding region as the first black matrix, such that the backlight has a protection structure that may prevent light leakage between adjacent sub-light source groups, which overcomes the light leakage problem between adjacent partitions of the prior backlight black insertion technique due to backlight partition, and then solves the problem of the black insertion effect being affected.

In at least one embodiment of the application, in an example, one light emitting device corresponds to one sub-pixel, and in another example, one light emitting device corresponds to multiple sub-pixels. Since the organic light emitting diode OLED may be as accurate as pixel level in the preparation process, and may be prepared to be a large size surface light source, the adoption of the OLED as the light emitting device of a sub-light source may implement disposition in correspondence with a pixel, and reach the control effect at a pixel level. As a light emitting device, the OLED has two advantages: 1. It may be accurately guaranteed that it is accurately implemented that the light-shielding region of the second black matrix of the backlight is the same as that of the first black matrix of the liquid crystal panel, which then realizes that the illumination of adjacent sub-light source groups is completely blocked, 2. Since each pixel of the OLED is independent of each other and may be controlled separately, that is, control may be performed on a single pixel or several pixels or several rows of pixels, which provides a hardware basis for achieving dynamic control of the brightness of the display device.

In at least one embodiment, the backlight further includes a substrate (not shown in FIG. 1), and the light emitting device is arranged on the substrate, such that light emitted by the light emitting device directly illuminates the liquid crystal panel without passing through other light guide film materials.

In the embodiment of the application, the backlight includes a substrate, the light emitting device is arranged on the substrate, and the self-luminous performance of the organic light emitting diode OLED is utilized, such that it may be unnecessary to dispose other light guide materials between the liquid crystal panel and the backlight, thereby reducing the product cost.

In at least one embodiment, each of the sub-pixel groups may include 4 rows of sub-pixels or 8 consecutive rows of sub-pixels.

In the embodiment of the application, a sub-pixel group may include any positive integer rows of sub-pixels. Considering the complexity of the preparation process, in an example, the sub-pixel group includes 4 consecutive rows of sub-pixels, and in another example, the sub-pixel group includes 8 consecutive rows of sub-pixels. As shown in FIG. 1, each of the sub-pixel groups includes 4 consecutive rows of sub-pixels.

In at least one embodiment, the display device further includes a light source group controller (not shown in FIG. 1), which is used for controlling the plurality of sub-light source groups to be lit or closed line by line.

Figure 2:
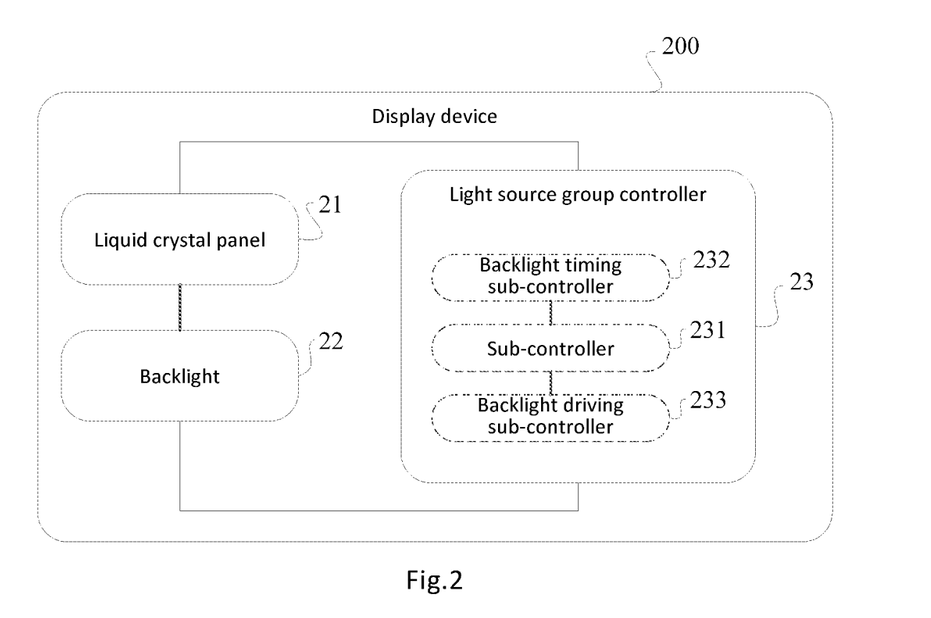
FIG. 2 shows a structural diagram of a display device according to another exemplary embodiment.

FIG. 2 shows a structural diagram of a display device according to another embodiment of the application.

In the embodiment of the application, as shown in FIG. 2, the display device 200 includes a liquid crystal panel 21, a backlight 22 and a light source group controller 23, wherein the light source group controller 23 is connected with the liquid crystal panel 21 and the backlight 22, respectively, and a plurality of sub-light source groups are controlled by the light source group controller 23 to be lit or closed line by line. The light source group controller 23 may be a controller of a different structure. For example, in an example, the light source group controller includes at least a sub-controller. In another example, the light source group controller includes a sub-controller and a backlight timing sub-controller. In still another example, the light source group controller includes a sub-controller and a backlight driver. In yet still another example, the light source group controller includes a sub-controller, a backlight timing sub-controller and a backlight driver. In other examples, the light source group controller may further include other relevant sub-controller which may be used for controlling the plurality of sub-light source groups to be lit or closed line by line. For the discussion of these elements, the details thereof are referred to the following.

In the embodiment of the application, a second black matrix is disposed in the backlight, which overcomes the light leakage problem existing between partitions when the display device adopts the backlight partition technique, and in at least one embodiment, the individual sub-light source groups of the backlight are controlled by the light source group controller to be lit or closed line by line, to implement flexible and dynamic adjustment of the brightness of the display device.

In at least one embodiment, as shown in FIG. 2, the light source group controller 23 includes a sub-controller 231, which generates and outputs a timing control signal for controlling the line-by-line lighting or closing of sub-light source group according to a frame synchronization signal and a first setting parameter, and generates and outputs a drive control signal for controlling the lighting degree of the sub-light source group according to a second setting parameter. The line-by-line lighting or closing of the sub-light source group and/or the lighting degree of the sub-light source group determines the display brightness of the display device.

Each time the display device is refreshed, the synchronization relationship needs to be reestablished between the liquid crystal panel and the backlight, and the sub-controller will receive a signal for keeping the synchronization between the liquid crystal panel and the backlight, i.e., a frame synchronization signal, from the liquid crystal panel again, for guaranteeing the synchronicity between the liquid crystal panel and the backlight. By the frame synchronization signal, it may be avoided that a display error is incurred due to unsynchronization of the control timing when the backlight is illuminating the liquid crystal panel.

Therein, the first setting parameter is used for controlling the continuous lighting time of each of the sub-light source groups of the backlight, and the parameter may be accomplished by a preset program. For example, it is implemented by the preset program controlling the duty cycle of a pulse modulated signal or directly setting the duration.

The first setting parameter may be an adjustable relevant parameter set according to the brightness requirement of the display device. The brightness requirement may be the intensity or duration of the brightness of the display device, and the relevant parameter may be the duty cycle of a pulse signal, etc.

Therein, the second setting parameter is used for controlling the lighting degree of each of the sub-light source groups of the backlight, which may be accomplished by a preset program. For example, the magnitude of a driving current is set by the preset program, and thereby the luminous brightness of the sub-light source group is controlled by the driving current.

Therein, the sub-controller determines the pulse upper edge and the timing period of the timing control signal for controlling the backlight based on the frame synchronization signal, and dynamically adjusts the duty cycle of the pulse period in the timing control signal of the backlight based on the first setting parameter, thereby implementing the adjustment of the continuous lighting time of the backlight and then the dynamic control of the display brightness of the backlight. By the adjustability of the timing control signal, the problem In some reference that the brightness of the display device cannot be dynamically adjusted is overcome.

The sub-controller may further generate a drive control signal for controlling the magnitude of the driving current based on the second setting parameter, to control the brightness of the display device.

In the embodiment of the application, by setting a second black matrix in the backlight, the light leakage problem existing between partitions is overcome when the display device employs the backlight partition technique. In at least one embodiment, a control signal is generated and outputted based on the frame synchronization signal and/or a relevant setting parameter, to dynamically control the brightness of the display device, wherein the sub-controller generates the timing control signal for controlling the line-by-line lighting or closing of the display device based on the frame synchronization signal and the first setting parameter, and/or generates the drive control signal for controlling the brightness of the display device based on the second setting parameter, which both may achieve flexible and dynamic control of the brightness of the backlight of the display device.

In at least one embodiment, the light source group controller further includes a backlight timing sub-controller 232 for receiving the timing control signal outputted by the sub-controller, and controlling the lighting and closing time of each of the sub-light source groups according to the timing control signal.

In the embodiment of the application, as shown in FIG. 2, the sub-controller 231 receives the frame synchronization signal sent by the liquid crystal panel 21, and parses the frame synchronization signal. The sub-controller 231 determines the pulse upper edge and the pulse period of the timing control signal based on the parsing result of the frame synchronization signal, and generates the timing control signal in combination with the first setting parameter. Then, the sub-controller 231 sends the timing control signal to the backlight timing sub-controller 232.

A procedure of the sub-controller 231 determining the pulse upper edge and the pulse period of the timing control signal is for example such that the sub-controller 231 parses the received frame synchronization signal, and may get a scan start moment of a first row of sub-pixels of the liquid crystal panel 21, and get a scan start moment of each of the sub-pixel groups and a scan period of the liquid crystal panel. Both the scan timing of the liquid crystal panel 21 and the timing of the lighting and closing of the backlight are associated with the frame synchronization signal, and therefore, according to the scan start moment of each of the sub-pixel groups of the liquid crystal panel, it may be possible to get a scan start moment of each of the sub-light source groups of the backlight, that is, determine the pulse upper edge of the pulse signal. At the same time, it may be possible to get a scan period of each row of sub-light source groups according to the scan period of the liquid crystal panel, that is, it may be possible to determine the pulse period.

The sub-controller 231 may further determine the duty cycle produced by the pulse based on the received first setting parameter, and may determine the continuous lighting time of each row of sub-light source groups for one time lighting by the duty cycle and the scan period of each row of sub-light source groups.

Therein, the scan start moment corresponds to the upper edge of the timing pulse, and the row scan period corresponds to the sum of the high level duration and the low level duration of the timing pulse, wherein the high level duration is defined as the continuous lighting time, and the low level duration is defined as the closing time or called the afterglow time. The first setting parameter is related with the continuous lighting time of the display device. The continuous lighting time of the backlight is adjusted by the first setting parameter, thereby realizing the dynamic adjustment of the brightness of the display device.

The sub-controller 231 then generates the timing control signal according to the scan start moment, the scan period and the continuous lighting time for one time lighting of each of the sub-light source groups of the backlight 22, and sends the timing control signal to the backlight timing sub-controller 232.

The backlight timing sub-controller 232 receives the timing control signal from the sub-controller 231, and controls the lighting and closing time of the backlight 22 according to the pulse upper edge, the pulse period and the duty cycle produced by the pulse of the timing control signal, thereby realizing the adjustment of the brightness of the display device, wherein the lighting and closing time includes at least a start lighting moment, the continuous lighting time and continuous closing time.

In the embodiment of the application, the light leakage problem of the display device between partitions due to backlight partition is overcome from the hardware. Further, the timing control signal is received by the backlight timing sub-controller to control the moments at which a sub-light source group of the backlight is lit and closed and the adjustability of the continuous lighting time, thereby achieving the control of the brightness of the display device.

In at least one embodiment, the light source group controller 23 further includes a backlight driving sub-controller 233 for receiving the drive control signal outputted by the sub-controller, and controlling the lighting degree of each row of sub-light source groups according to the drive control signal.

In this embodiment, the drive control signal for controlling the brightness of the display device which is generated by the sub-controller 231 based on the second setting parameter is sent to the backlight driving sub-controller 233. The second setting parameter may be a driving current parameter of the display device or other parameter which affects the brightness of the display device. Taking the driving current parameter as an example, the driving current parameter is adjusted by the second setting parameter, thereby generating the driving control signal which affects the driving current for changing the brightness lighting a light emitting device of the backlight, thereby adjusting the display brightness of the backlight. Afterwards, the backlight driving sub-controller 233 receives the drive control signal from the sub-controller 231, to control a drive circuit to adjust the lighting degree of the display device.

In at least one embodiment, the light source group controller 23 may further simultaneously include: a backlight timing sub-controller 232 for receiving the timing control signal outputted by the sub-controller, and controlling the lighting and closing time of each of the sub-light source groups according to the timing control signal, and a backlight driving sub-controller 233 for receiving the drive control signal outputted by the sub-controller, and controlling the lighting degree of each row of sub-light source groups according to the drive control signal.

In some embodiments of the application, the light leakage problem of the display device between partitions due to backlight partition is overcome from the hardware, and it is provided that the lighting degree of a sub-light source group of the backlight is controlled based on the drive control signal, achieving the control of the brightness of the display device.

At least one embodiment of the application further provides a virtual reality display apparatus including a display device discussed in any of the above embodiments.

Figure 3:
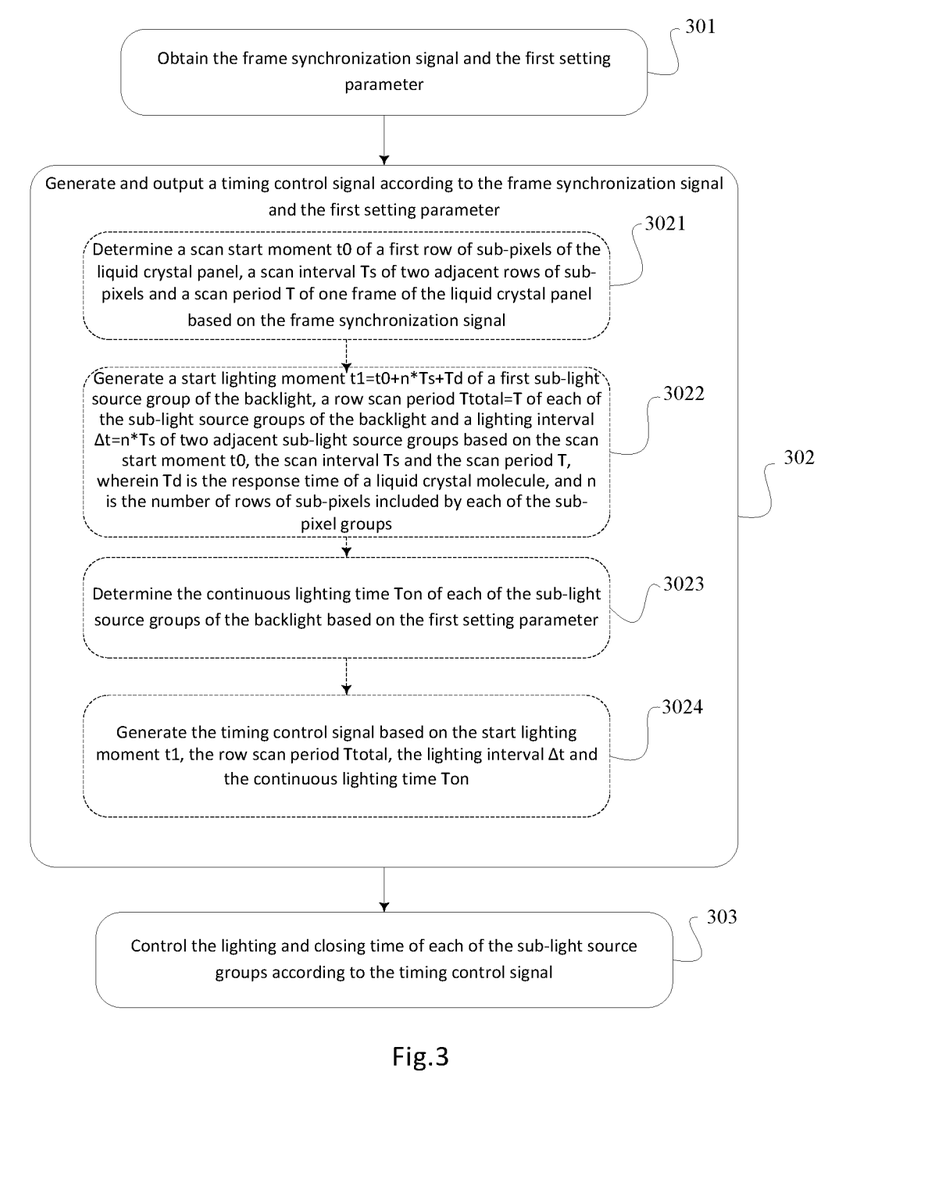
FIG. 3 shows an exemplary flow chart of a display device control method according to at least one exemplary embodiment.

FIG. 3 shows an exemplary flow chart of a display device control method according to at least one embodiment of the application.

As shown in FIG. 3, the embodiment of the application provides a display device control method for controlling any of the display devices as provided by the above embodiments, which method includes the following steps.

At step 301, the frame synchronization signal and the first setting parameter are obtained.

In the embodiment of the application, each time the display device is refreshed, the synchronization relationship needs to be reestablished between the liquid crystal panel and the backlight, and the sub-controller will receive a signal for keeping the synchronization between the liquid crystal panel and the backlight, i.e., a frame synchronization signal, from the liquid crystal panel again, for guaranteeing the synchronicity between the liquid crystal panel and the backlight. By the frame synchronization signal, it may be avoided that a display error is incurred due to unsynchronization of the control timing when the backlight is illuminating the liquid crystal panel. In an example, the sub-controller (or other control device, which will not be limited here) receives the frame synchronization signal and the first setting parameter from the liquid crystal panel in the display device.

The frame synchronization signal may be actively sent by the liquid crystal panel to the sub-controller, or the sub-controller actively obtains it from the liquid crystal panel.

Therein, the first setting parameter is used for controlling the continuous lighting time of each row of sub-light source groups of the backlight, which may be accomplished by a preset program. For example, it is implemented by the preset program controlling the duty cycle of a pulse modulated signal or directly setting the duration.

The first setting parameter may be an adjustable relevant parameter set according to the brightness requirement of the display device. The brightness requirement may be the intensity or duration of the brightness of the display device, and the relevant parameter may be the duty cycle of a pulse signal, etc.

At step 302, a timing control signal is generated and outputted according to the frame synchronization signal and the first setting parameter.

In at least one embodiment, the sub-controller receives the frame synchronization signal sent by the liquid crystal panel, and parses the frame synchronization signal. Then, the sub-controller determines the pulse upper edge and the pulse period of the timing control signal based on the parsing result of the frame synchronization signal. The sub-controller further determines the duty cycle produced by the pulse based on the first setting parameter. As such, it may be possible to adjust the duty cycle and thus the pulse signal by the first setting parameter, and generate a timing control signal according to the determined pulse upper edge, the pulse period and the duty cycle, to achieve the brightness adjustment of the display device.

In the embodiment of the application, the scan circuit of the liquid crystal panel and the timing circuit of the backlight are controlled by the sub-controller. The sub-controller may determine a start lighting moment and a row scan period Ttotal of the backlight (here, the row scan period may also be called a lighting period or a lighting pulse period) according to the frame synchronization signal. Therein, the start lighting moment corresponds to the upper edge of the timing pulse, and the row scan period corresponds to the sum of the high level duration and the low level duration of the timing pulse, wherein the high level duration is defined as the continuous lighting time, and the low level duration is defined as the closing time or called the afterglow time. The first setting parameter is related with the continuous lighting time of the display device. The continuous lighting time of the backlight is adjusted by the first setting parameter, thereby realizing the dynamic adjustment of the brightness of the display device. Based on the start lighting moment and the continuous lighting time of the backlight, the timing control signal is generated, to control the operation of a light emitting device, thereby adjusting the brightness of the display device.

In at least one embodiment, the step 302 may further include:

step 3021: determining a scan start moment $t0$ of a first row of sub-pixels of the liquid crystal panel, a scan interval $Ts$ of two adjacent rows of sub-pixels and a scan period $T$ of the liquid crystal panel based on the frame synchronization signal, step 3022: generating a start lighting moment $t1=t0+n*Ts+Td$ of a first sub-light source group of the backlight, a row scan period $Ttotal=T$ of each of the sub-light source groups of the backlight and a lighting interval $\Delta t=n*Ts$ of two adjacent sub-light source groups based on the scan start moment $t0$, the scan interval $Ts$ and the scan period $T$, wherein $Td$ is the response time of a liquid crystal molecule, and $n$ is the number of rows of sub-pixels included by each of the sub-pixel groups, step 3023: determining the continuous lighting time $Ton$ of each of the sub-light source groups of the backlight based on the first setting parameter, and step 3024: generating the timing control signal based on the start lighting moment $t1$, the row scan period $Ttotal$, the lighting interval $\Delta t$ and the continuous lighting time $Ton$.

Therein, the row scan period $Ttotal$ may be the time length of the scan period $T$, and according to a different duty cycle setting, the row scan period may be formed by combining different continuous lighting time $Ton$ and continuous closing time $Toff$. For example, the row scan period $Ttotal$ is 1 ms, the continuous lighting time $Ton$ is 0.7 ms, and the continuous closing time $Toff$ is 0.3 ms. Or, the row scan period $Ttotal$ is 1 ms, the continuous lighting time $Ton$ is 0.6 ms, and the continuous closing time $Toff$ is 0.4 ms.

In the embodiments of the application, each of the sub-light source groups of the backlight is disposed in correspondence with each of the sub-pixel groups of the liquid crystal panel. With a sub-pixel group including 4 rows of sub-pixels as an example (just for exemplary illustration, not for limitation), as shown in FIG. 1, that each of the sub-light source groups is disposed in correspondence with each of the sub-pixel groups may be understood as that a first sub-light source group 109 corresponds to a first sub-pixel group, and the first sub-pixel group includes a first row of sub-pixels 101, a second row of sub-pixels 102, a third row of sub-pixels 103, and a fourth row of sub-pixels 104, and a second sub-light source group 110 corresponds to a second sub-pixel group, and the second sub-pixel group includes a fifth row of sub-pixels 105, a sixth row of sub-pixels 106, a seventh row of sub-pixels 107, and an eighth row of sub-pixels 108.

After the scanning of each of the sub-pixel groups is completed, it waits for the time required for a liquid crystal molecule inversion response, i.e., the liquid crystal molecule response time $Td$, and only then the lighting of each of the sub-light source groups is triggered.

For example, after the scanning of its corresponding n rows of sub-pixel groups is completed, the first sub-light source group needs to wait for the response time $Td$ for the liquid crystal molecule inversion, before the lighting can be triggered, that is, it is necessary to delay $Td+n*Ts$ for the first sub-light source group as compared to the first sub-pixel group, before the lighting action can be triggered, thereby guaranteeing the black insertion effect and avoiding the smear and flicker phenomena of the display device. Similarly, after the scanning of the second sub-pixel group is completed, the second sub-light source group waits for the liquid crystal molecule response time Td before the lighting is triggered again. The second sub-light source group delays Td+2n*Ts to be lit as compared to the first row of sub-pixels, and by analogy, the interval of the lighting of each of the sub-light source group may be obtained as n*Ts.

The first setting parameter may be the duty cycle of the pulse signal, and by setting the parameter, for example, by setting it manually or by system automatic matching, the continuous lighting time Ton of each row of sub-light source groups in the backlight may be controlled.

In some reference, since the light leakage phenomenon exists between two adjacent light source groups, the two adjacent sub-light source groups are lit, and there can be no overlap in timing. That is to say, when one light source group is lit, its immediately subsequent sub-light source group is not allowed to be lit simultaneously. The lighting interval of each row of sub-light source groups is n*Ts, and to avoid the light leakage phenomenon, the duration for which each of the sub-light source groups is lit for one time cannot exceed n*Ts, which thus causes the duration of being lit for one time to be severely restricted, and affects the overall display brightness.

As compared to the prior art, in the embodiments of the application, a second black matrix which coincides with the first black matrix of the liquid crystal panel is disposed in the backlight, which effectively solves the light leakage problem, and meanwhile, also provides hardware support for that two adjacent sub-light source groups can be lit simultaneously, and greatly widens the adjustable range of the continuous lighting time of a sub-light source group. According to the requirement of display brightness adaptability, different control parameters are set to control the continuous lighting time Ton of each of the sub-light source group, thereby controlling the overall display brightness of a display device and achieving the flexible control of the display brightness.

Figure 4:
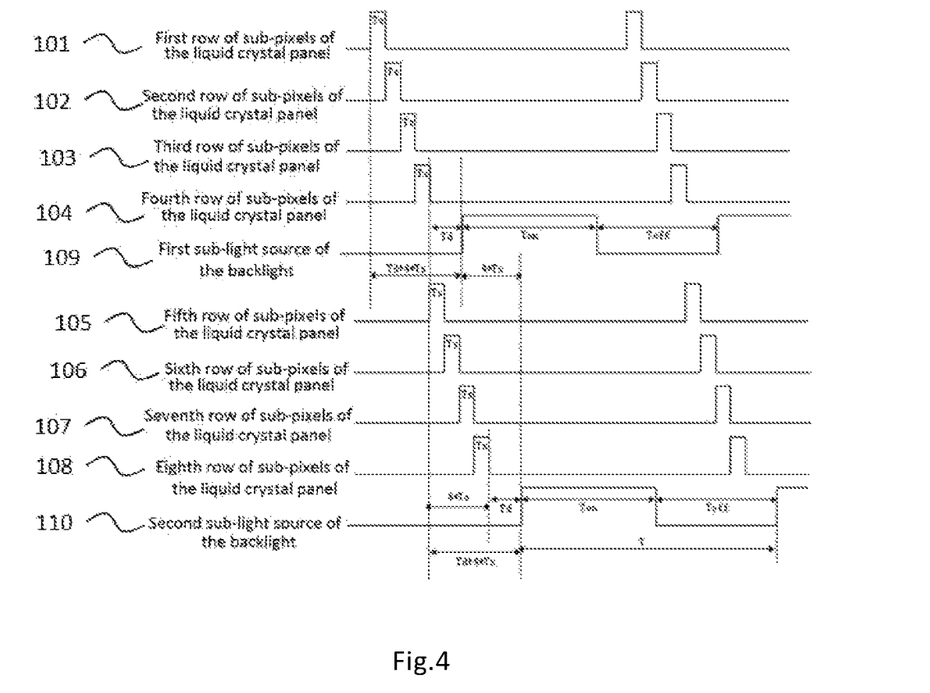
FIG. 4 shows a schematic diagram of a scan timing signal of a backlight according to at least one exemplary embodiment.

For example, FIG. 4 shows a schematic diagram of a scan timing signal according to at least one embodiment of the application.

As shown in FIG. 4, with a 5.7 inch UHD TFT-LCD panel as an example, the panel includes 3840 rows of sub-pixels, and the 3840 rows of sub-pixels of the liquid crystal panel may be divided into 960 sub-pixel groups by every 4 consecutive rows of sub-pixels being grouped into one group, wherein each of the sub-pixel groups includes 4 rows of sub-pixels. Accordingly, the backlight includes 960 sub-light source groups corresponding to each of the sub-pixel groups, and each of the sub-light source groups includes a plurality of OLED light emitting devices. The scan start moment t0 of the first row of sub-pixels of the liquid crystal panel is contained in the frame synchronization signal, and the frame synchronization signal is sent to the sub-controller or other control device via the liquid crystal panel. Based on the frame synchronization signal, the sub-controller may determine the start lighting moment t1 of the first sub-light source group, that is, t1=t0+Td+4*Ts. Accordingly, the start lighting moment t2 of the second sub-light source group t2=t0+Td+8*Ts.

By analogy, the start lighting moment at which each of the sub-light source groups of the backlight is lit is determined, wherein Td is the response time required for the liquid crystal molecule inversion, and Ts is the time required for the scanning of each row of sub-pixels of the liquid crystal panel, namely, the scan interval of two adjacent rows of sub-pixels. Since the second black matrix of the backlight coincides with the first black matrix of the liquid crystal panel, which avoids generation of light leakage when two adjacent sub-light source groups are lit, variable adjustment may be implemented for the continuous lighting time Ton of each of the sub-light source groups. For example, the adjustment is made by the first setting parameter.

In further embodiments, the step 3022 and the step 3023 are relatively independent, and the two may be interchanged, or also may be performed simultaneously.

At step 303, the lighting and closing time of each of the sub-light source groups is controlled according to the timing control signal.

In at least one embodiment, the steps 301 and 302 are performed by the sub-controller 231 as shown in FIG. 2, and the step 303 is performed by the backlight timing sub-controller 232 as shown in FIG. 2.

In the embodiments of the application, the lighting time and the closing time (which is equivalent to the afterglow time In some reference) of a sub-light source group of the backlight is controlled by the timing control signal. By extending the lighting time and shortening the closing time relatively, low afterglow is thereby achieved, and the brightness of a display device is controlled.

In the embodiments of the application, the light leakage problem of a display device is overcome from the hardware, and the lighting moment and the continuous lighting time of a sub-light source group of the backlight is flexibly controlled by the timing control signal, which may thus achieve the flexible and dynamic control of the brightness of the display device.

Figure 5:
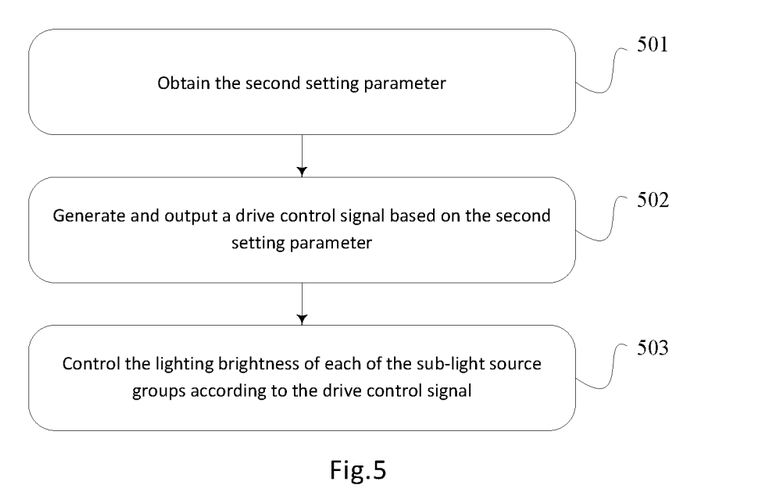
FIG. 5 shows an exemplary flow chart of a display device control method according to another exemplary embodiment of the application.

FIG. 5 shows an exemplary flow chart of a method for controlling the brightness of a backlight according to another embodiment of the application.

As shown in FIG. 5, another embodiment of the application provides a method for controlling the brightness of a backlight, which is used for adjusting any of the display devices as provided by the above embodiments, and the method includes the following steps.

At step 501, the second setting parameter is obtained.

At step 502, a drive control signal is generated and outputted based on the second setting parameter.

At step 503, the lighting degree of each row of sub-light source groups is controlled according to the drive control signal.

In at least one embodiment, at the step 501, the second setting parameter is received by the sub-controller as described in FIG. 2, and then at the step 502, the drive control signal is generated by the sub-controller as described in FIG. 2 based on the second setting parameter, to control an appropriate driver to control the lighting degree of a sub-light source group. Here, the lighting degree may also be called brightness or lighting brightness. The brightness of the display device is controlled by the drive control signal generated based on the second setting parameter and outputted by the sub-controller, wherein the second setting parameter may be a driving current parameter of the display device or other parameter which affects the brightness of the display device. Taking the driving current parameter as an example, the driving current parameter is adjusted by the second setting parameter, thereby generating the driving control signal which affects the driving current for changing the brightness lighting a light emitting device of the backlight, thereby adjusting the display brightness of the backlight.

In the embodiments of the application, by the second black matrix of the backlight having the same light-shielding region as the first black matrix of the liquid crystal panel, the intractable light leakage problem between adjacent partitions when the backlight is partitioned In some reference is solved. By one-to-one correspondence disposition of sub-light source groups and sub-pixel groups of the liquid crystal panel, a hardware condition is provided for extending the time for which a sub-pixel group is lit. Based on the hardware improvement, there is proposed a method for dynamically controlling the display brightness of a display device based on the timing control signal or the drive control signal of the display device, thereby achieving flexible regulation of the backlight of the liquid crystal display device.

In the description of the above embodiments, specific features, structures, materials or characteristics may be combined in a suitable way in any one or more of the embodiments or examples, and various techniques may be described in a general context of software, hardware, elements or program modules. In general, the modules include routines, programs, objects, elements, components, and data structures, etc., which perform specific tasks or implement specific abstract data types. The term "ware", etc. generally represents software, firmware, hardware or a combination thereof. Features of the techniques described herein are independent of the platform, which means that the techniques may be embodied on various platform having various processors or circuits.

What are described above are just the preferable embodiments of the application and the illustration of the applied technical principles. It should be appreciated by the person having ordinary skills in the art that the scope of the disclosure covered in this application is not limited to technical solutions formed by specific combinations of the above technical features, and at the same time, should also encompass other technical solutions formed by any combinations of the above technical features or their equivalent features, without departing from the concepts of the disclosure, for example, technical solutions formed by the above features and technical features (not limited thereto) disclosed in the application and having similar functions replacing each other.

The invention claimed is:

1. A display device including:
   a liquid crystal panel, which includes a plurality of sub-pixel groups and a first black matrix, each of the sub-pixel groups including n consecutive rows of sub-pixels, n being any positive integer, and the first black matrix being disposed between two adjacent sub-pixel groups, and
   a backlight, which includes a plurality of sub-light source groups and a second black matrix, which the second black matrix is disposed between two adjacent sub-light source groups, each of the plurality of sub-light source groups being disposed in one-to-one correspondence with each of the plurality of sub-pixel groups, and the second black matrix having a same light-shielding region as the first black matrix.

2. The display device as claimed in claim 1, wherein each of the plurality of sub-light source groups includes one or more light emitting devices, each light emitting device corresponds to at least one sub-pixel, and the one or more light emitting devices is organic light emitting diodes.

3. The display device as claimed in claim 2, wherein the backlight further includes a substrate, and one or more light emitting devices is arranged on the substrate, such that light emitted by the one or more light emitting devices directly lights the liquid crystal panel.

4. The display device as claimed in claim 1, wherein each of the plurality of sub-pixel groups includes 4 or 8 rows of sub-pixels.

5. The display device as claimed in claim 1, wherein the display device further includes a light source group controller, configured to control the plurality of sub-light source groups to be lit or closed line by line.

6. The display device as claimed in claim 5, wherein the light source group controller includes:
   a sub-controller configured to obtain a frame synchronization signal and a first setting parameter, and generate and output a timing control signal according to the frame synchronization signal and the first setting parameter, wherein the timing control signal is configured to control the plurality of sub-light source groups to be lit or closed line by line,
   wherein the frame synchronization signal is configured to keep a synchronization between the liquid crystal panel and the backlight, and the first setting parameter is related with continuous lighting time of each sub-light source group.

7. The display device as claimed in claim 5, wherein a sub-controller is further configured to obtain a second setting parameter, and generate and output a drive control signal as to control lighting degree of each sub-light source group according to the second setting parameter, wherein the second setting parameter is related with the lighting degree of each sub-light source groups.

8. The display device as claimed in claim 6, wherein the light source group controller further includes:
   a backlight timing sub-controller is configured to receive the timing control signal outputted by the sub-controller, and control lighting and closing time of each of the plurality of sub-light source groups according to the timing control signal.

9. The display device as claimed in claim 7, wherein the light source group controller further includes:
   a backlight driving sub-controller is configured to receive the drive control signal outputted by the sub-controller, and control the lighting degree of each of the sub-light source groups according to the drive control signal.

10. The display device as claimed in claim 1, wherein a third black matrix is disposed between two adjacent rows of sub-pixels within each of the sub-pixel groups.

11. A virtual reality display apparatus including a display device as claimed in claim 1.

12. A display device control method for controlling a display device as claimed in claim 6, the method includes:
   obtaining the frame synchronization signal and the first setting parameter,
   generating and outputting a timing control signal according to the frame synchronization signal and the first setting parameter, and
   controlling the lighting and closing time of each of the plurality of sub-light source groups according to the timing control signal.

13. The method as claimed in claim 12, wherein the obtaining the frame synchronization signal includes:
   receiving the frame synchronization signal from the liquid crystal panel when each time the display device is refreshed, wherein the frame synchronization signal in configured to keep the synchronization between the liquid crystal panel and the backlight.

14. The method as claimed in claim 12, wherein the generating and outputting the timing control signal according to the frame synchronization signal and the first setting parameter includes:

determining a scan start moment t0 of a first row of sub-pixels of the liquid crystal panel, a scan interval Ts of two adjacent rows of sub-pixels and a scan period T of one frame of the liquid crystal panel based on the frame synchronization signal, determining a start lighting moment t1=t0+n*Ts+Td of a first sub-light source group of the backlight, a row scan period Ttotal=T of each of the sub-light source groups of the backlight and a lighting interval Δt=n*Ts of the two adjacent sub-light source groups based on the scan start moment t0, a scan interval Ts and a scan period T, wherein Td is a response time of a liquid crystal molecule, and n is a number of rows of sub-pixels included by each of the sub-pixel groups, determining a continuous lighting time Ton of each of the plurality of sub-light source groups of the backlight based on the first setting parameter, and generating the timing control signal based on the start lighting moment t1, the row scan period Ttotal, the lighting interval Δt and the continuous lighting time Ton.

15. A display device control method for controlling a display device as claimed in claim 9, which method includes:

obtaining the second setting parameter, generating and outputting a drive control signal according to the second setting parameter, and controlling a lighting brightness of each of the plurality of sub-light source groups according to the drive control signal.

16. The virtual reality display apparatus as claimed in claim 11, wherein each of the plurality of sub-light source groups includes one or more light emitting devices, each light emitting device corresponds to at least one sub-pixel, and the one or more light emitting devices is organic light emitting diodes.

17. The virtual reality display apparatus as claimed in claim 11, wherein the backlight further includes a substrate, and one or more light emitting devices is arranged on the substrate, such that light emitted by the one or more light emitting devices directly light the liquid crystal panel.

18. The virtual reality display apparatus as claimed in claim 11, wherein each of the plurality of sub-pixel groups includes 4 or 8 rows of sub-pixels.

19. The virtual reality display apparatus as claimed in claim 11, wherein the display device further includes a light source group controller, configured to control the plurality of sub-light source groups to be lit or closed line by line.

20. The virtual reality display apparatus as claimed in claim 11, wherein a light source group controller includes:

a sub-controller configured to obtain a frame synchronization signal and a first setting parameter, and generate and output a timing control signal according to the frame synchronization signal and the first setting parameter, wherein the timing control signal is configured to control the plurality of sub-light source groups to be lit or closed line by line, wherein the frame synchronization signal is configured to keep a synchronization between the liquid crystal panel and the backlight, and the first setting parameter is related with continuous lighting time of each sub-light source group.

* * * * *